United States Patent
Puhoffa et al.

(10) Patent No.: US 11,290,523 B1
(45) Date of Patent: Mar. 29, 2022

(54) HIGH-SPEED TRANSFER OF DATA FROM DEVICE TO SERVICE

(71) Applicant: International Business Machines Corporation, Armonk, NY (US)

(72) Inventors: Hanna Puhoffa, Fremont, CA (US); Matthias Seul, Pleasant Hill, CA (US); Brian Din, Davis, CA (US); Keira Louise Hopkins, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/304,511

(22) Filed: Jun. 22, 2021

(51) Int. Cl.
G06F 15/16 (2006.01)
H04L 67/06 (2022.01)
H04L 29/06 (2006.01)

(52) U.S. Cl.
CPC .......... *H04L 67/06* (2013.01); *H04L 63/0281* (2013.01); *H04L 63/08* (2013.01); *H04L 63/306* (2013.01)

(58) Field of Classification Search
None
See application file for complete search history.

(56) References Cited

U.S. PATENT DOCUMENTS

| | | | |
|---|---|---|---|
| 7,536,291 B1* | 5/2009 | Vijayan Retnamma | G06F 3/0619 709/220 |
| 9,628,437 B2 | 4/2017 | Dempsky et al. | |
| 9,917,882 B2 | 3/2018 | Liddicott et al. | |
| 10,178,159 B2* | 1/2019 | Prashant | H04L 67/141 |
| 10,187,469 B2 | 1/2019 | Chen et al. | |
| 10,924,458 B2 | 2/2021 | Chaubey et al. | |
| 2004/0006615 A1 | 1/2004 | Jackson | |
| 2011/0154477 A1* | 6/2011 | Parla | H04L 63/102 726/15 |
| 2014/0207874 A1* | 7/2014 | Soorianarayanan | H04L 65/403 709/206 |
| 2015/0296004 A1* | 10/2015 | Goel | H04L 67/141 709/204 |
| 2016/0156616 A1 | 6/2016 | Chen et al. | |

(Continued)

FOREIGN PATENT DOCUMENTS

| CN | 106254425 A | 12/2016 |
|---|---|---|
| EP | 1264432 B1 | 7/2016 |

(Continued)

OTHER PUBLICATIONS

"Receiving simple data from other apps," Android for Developers, Google Developers, Accessed Jun. 18, 2021, 9 pages. https://developer.android.com/training/sharing/receive.

(Continued)

*Primary Examiner* — Quang N Nguyen
(74) *Attorney, Agent, or Firm* — Yee & Associates, P.C.

(57) ABSTRACT

Automatic file transfer is provided. A file is obtained utilizing a file generating application on a mobile device in response to an input from a user. The mobile device connected to a network. The file is automatically transferred from the mobile device to a target service via the network utilizing a high-speed file transfer application running on the mobile device such that high-speed transfer of the file from the mobile device to the target service is enabled even though the file generating application does not support the high-speed transfer.

20 Claims, 9 Drawing Sheets

(56) References Cited

U.S. PATENT DOCUMENTS

| | | | |
|---|---|---|---|
| 2017/0323024 A1* | 11/2017 | Vecera | G06K 19/06037 |
| 2018/0183794 A1 | 6/2018 | Desai et al. | |
| 2020/0186500 A1 | 6/2020 | Neystadt et al. | |
| 2020/0372040 A1* | 11/2020 | Boehmann | G06F 9/5072 |
| 2021/0158928 A1* | 5/2021 | Pereira | G06F 21/6245 |

FOREIGN PATENT DOCUMENTS

| | | |
|---|---|---|
| TW | 201621695 A | 6/2016 |
| WO | WO2006105469 A1 | 10/2006 |
| WO | WO2013188179 A2 | 12/2013 |

OTHER PUBLICATIONS

Mell et al., "The NIST Definition of Cloud Computing," Computer Security Division, National Institute of Standards and Technology, Jan. 2011, 7 pages.

* cited by examiner

HIGH-SPEED TRANSFER OF DATA FROM DEVICE TO SERVICE

BACKGROUND

1. Field

The disclosure relates generally to network data transfers and more specifically to automatically performing a high-speed transfer of a data file from a mobile device to a target cloud service via a Fast Adaptive and Secure Protocol (FASP®) server using a FASP file transfer application running on the mobile device even though the file generating application of the mobile device that generated the data file or the target cloud service does not support a FASP-based high-speed file transfer. FASP is a registered trademark of International Business Machines Corporation, Armonk, N.Y.

2. Description of the Related Art

Transferring and sharing electronically stored information via a network is becoming a part of daily life for many individuals and entities, such as, for example, enterprises, companies, businesses, organizations, institutions, agencies, and the like. Current technologies cannot handle the increasing growth of data, thereby increasing network latency, increasing costs, and inhibiting productivity. For example, Transmission Control Protocol (TCP), an underlying protocol behind most of today's data transfer applications, creates packet loss by overdriving the use of available bandwidth, then instantaneously brings down the transmission rate and slowly accelerates it back up, just to overdrive it again. This results in a decreased overall transmission rate and under-utilization of available bandwidth.

SUMMARY

According to one illustrative embodiment, a method for automatic file transfer is provided. A mobile device obtains a file utilizing a file generating application on the mobile device in response to an input from a user. The mobile device connected to a network. The mobile device transfers the file automatically from the mobile device to a target service via the network utilizing a high-speed file transfer application running on the mobile device such that high-speed transfer of the file from the mobile device to the target service is enabled even though the file generating application does not support the high-speed transfer. According to other illustrative embodiments, a mobile device and computer program product for automatic file transfer are provided.

DETAILED DESCRIPTION

Figure 1:
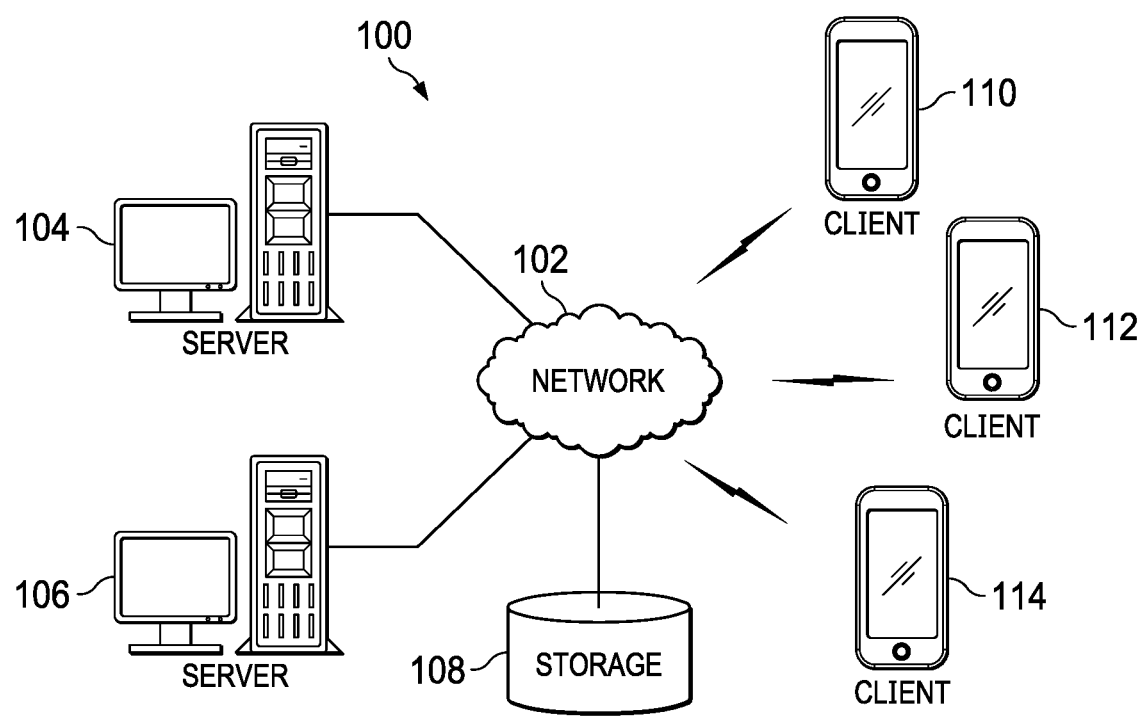
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-6, diagrams of data processing environments are provided in which illustrative embodiments may be implemented. It should be appreciated that FIGS. 1-6 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent multiple computing nodes in a multi-cloud environment managed by different entities. Alternatively, server 104 and server 106 may each represent a cluster of servers in different data centers.

In addition, server 104 provides a set of services, such as, for example, file storage services, file sharing services, social media services, and the like, to users of client 110, client 112, and client 114. Server 106 provides high-speed file transfer services from clients 110, 112, and 114 to server 104.

Client 110, client 112, and client 114 also connect to network 102. Clients 110, 112, and 114 are clients of server 104 and server 106. In this example, clients 110, 112, and 114 are shown as mobile devices, such as, for example, mobile phones or smart phones with wireless communication links to network 102. However, it should be noted that clients 110, 112, and 114 are examples only and may represent other types of mobile devices, such as, for example, laptop computers, handheld computers, personal digital assistants, smart watches, smart vehicles, smart glasses, gaming devices, and the like, with wireless communication links to network 102. Users may use clients 110, 112, and 114 to utilize the file storage and sharing services provided by server 104 and the high-speed file transfer services provided by server 106.

Storage 108 is a network storage device capable of storing any type of data in a structured format or an unstructured format. In addition, storage 108 may represent a plurality of network storage devices. Further, storage 108 may store identifiers and network addresses for a plurality of servers corresponding to different services, identifiers and network addresses for a plurality of client devices, identifiers for a plurality of client device users, a plurality of different data files corresponding to the plurality of client device users, and the like. Furthermore, storage 108 may store other types of data, such as authentication or credential data that may include usernames, passwords, and the like associated with client device users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
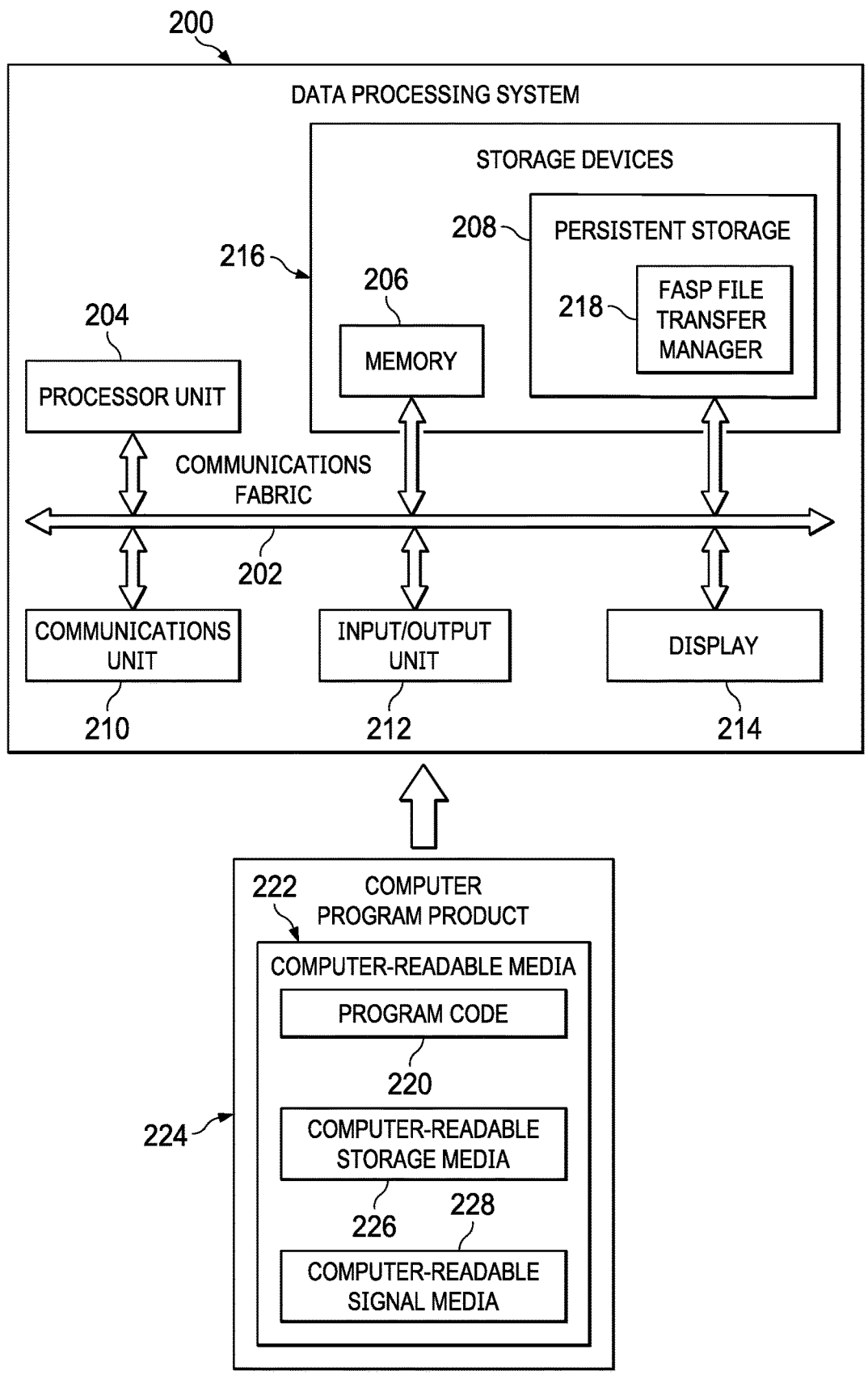
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a mobile device, such as client 110 in FIG. 1, in which computer-readable program code or instructions implementing the high-speed file transfer processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores FASP file transfer manager 218. However, it should be noted that even though FASP file transfer manager 218 is illustrated as residing in persistent storage 208, in an alternative illustrative embodiment, FASP file transfer manager 218 may be a separate component of data processing system 200. For example, FASP file transfer manager 218 may be a hardware component coupled to communication fabric 202 or a combination of hardware and software components.

FASP file transfer manager 218 controls the process of automatically performing a high-speed transfer of a file, such as a photograph file, video file, sound recording file, multimedia file, or the like, from data processing system 200 to a target cloud service hosted by a server, such as, for example, server 104 in FIG. 1, via a FASP server, such as, for example, server 106 in FIG. 1, even when a file generating application of data processing system 200 that generated the file or the target cloud service does not support a FASP-based high-speed file transfer. The target cloud service may be, for example, a data and file storage service, a photograph and video sharing service, a social media service, or the like.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
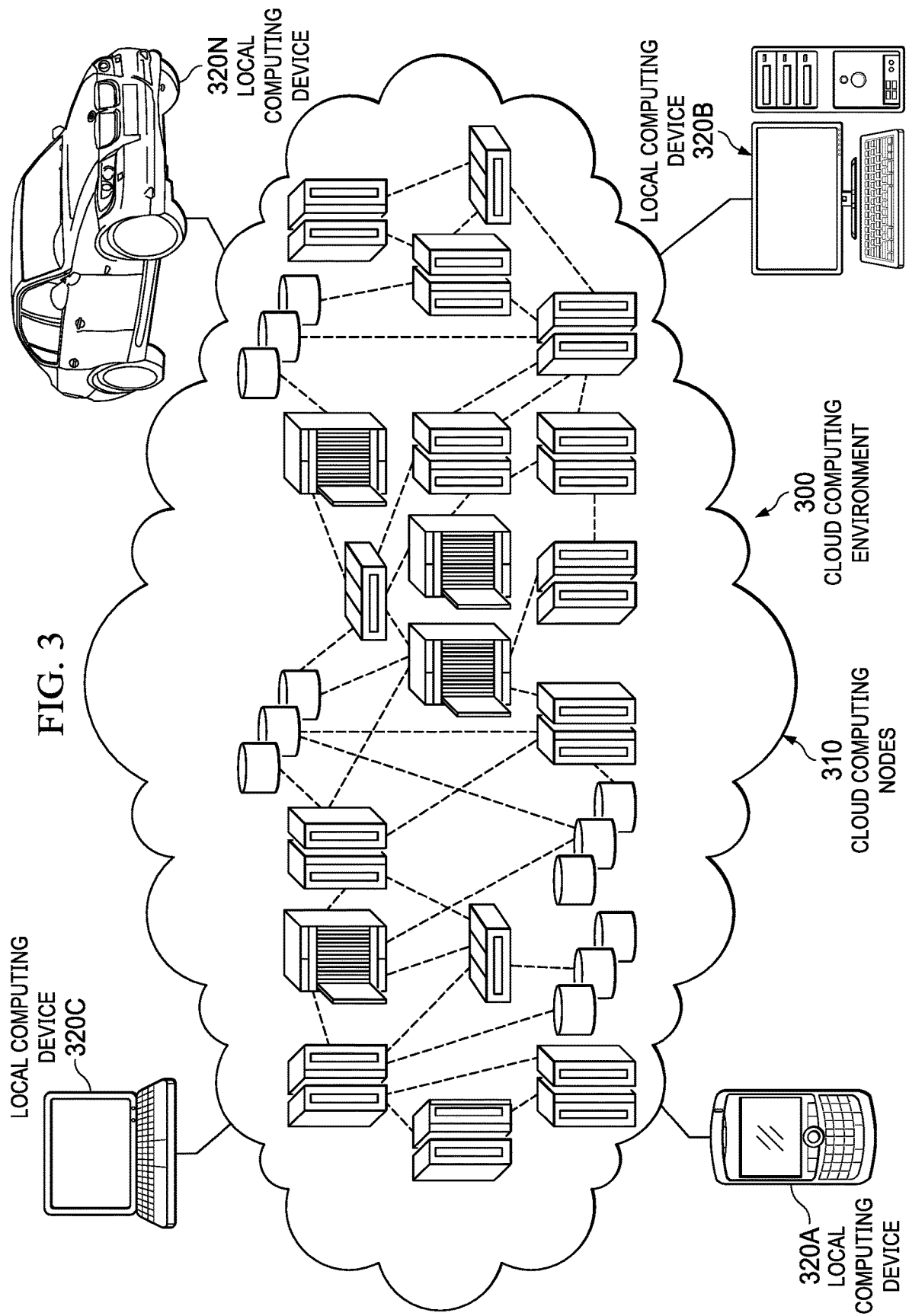
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
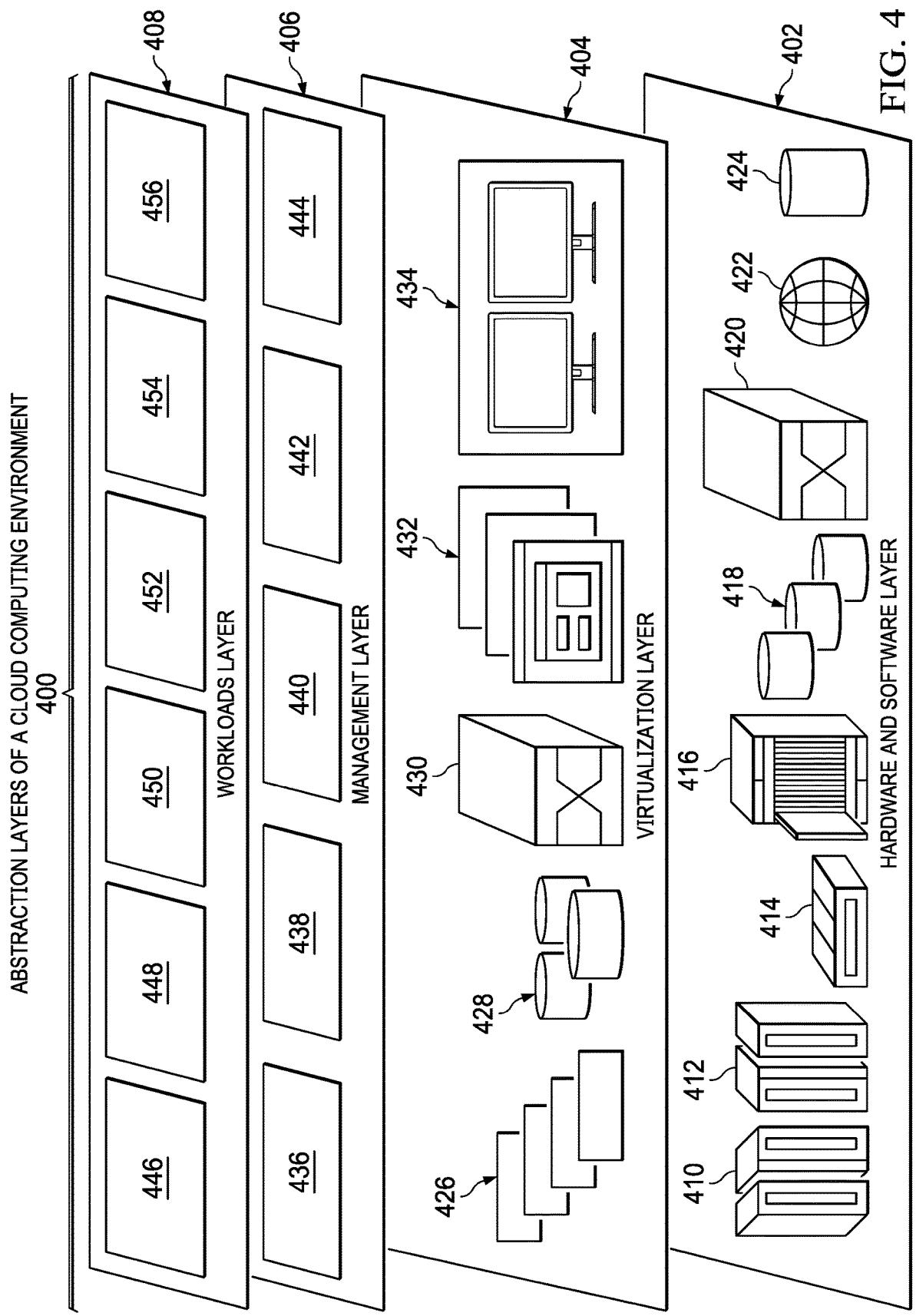
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and high-speed file transfer management 456.

Today, with file sizes increasing and life becoming more digital, individuals are storing a multitude of data on mobile devices (e.g., mobile phones, tablet computers, laptop computers, and the like). These individuals, using Wi-Fi, a cellular network, or the like, transfer files from their mobile devices to a target or destination cloud service to store the data files and free up storage (e.g., disk space) on their mobile devices.

However, uploading data files (e.g., photograph files, video files, audio recording files, multimedia content files, and the like) from a source mobile device to a target cloud service (e.g., file sharing service, file storage service, social media service, or the like) can take a long time, especially over a slow or unreliable network. Currently, uploading these data files takes manual effort to start the upload, manual effort to check status of the upload, manual effort to potentially restart a timed-out upload, and time for the upload to occur with no guarantee of success.

Illustrative embodiments enable high-speed upload and transfer of data files to the cloud using FASP even if at least one of the source mobile device or target cloud service does not support FASP-based high-speed file transfers. FASP is a network high-speed data and file transfer protocol. FASP does not expect feedback on every packet sent, but only on those packets marked as lost must be requested again by the target recipient. As a result, FASP does not suffer as much loss of throughput as Transmission Control Protocol (TCP) does on networks with high latency or high packet loss.

For example, FASP fills the gap left by TCP in supplying reliable transport for applications because FASP does not require byte-stream delivery and thoroughly segregates reliability and rate control. FASP uses standard User Datagram Protocol in the transport layer and attains decoupled congestion and reliability control in the application layer through a technical optimal approach that retransmits the real packet loss accurately on the channel. Due to the decoupling of the reliability and rate control, new packets need not slow down for the retransferring of lost packets as in TCP-based byte streaming applications. Data that is lost in transmission is retransmitted at a rate that meets the available bandwidth inside the end-to-end path, with zero duplicate retransmissions for zero receiving cost.

Thus, unlike TCP, FASP transfer can achieve speed a hundred times faster than Hypertext Transfer Protocol or File Transfer Protocol. With built-in security and bandwidth control, FASP provides an assured and secured delivery time regardless of transfer distance, file size, or network conditions. Illustrative embodiments perform high-speed file transfers by manipulating the way a mobile operating system on a mobile device works in several different ways, such as, for example, application intent hijacking, proxy interception, storage redirection, and the like.

Illustrative embodiments provide a capture and relay service, which enables FASP-based high-speed file transfers from a given mobile device to a target cloud service. The capture and relay service of illustrative embodiments enables FASP-based high-speed file transfers even when the target cloud service or source mobile device (i.e., the file generating application on the mobile device) does not support FASP. In other words, illustrative embodiments provide a personalized reverse content delivery network that is based on FASP, which quickly uploads files to the target cloud service from the mobile device, whereas a typical content delivery network transfers data to a mobile device based on the geographic location of the server delivering the content. Illustrative embodiments capture the intent to transfer a file at the source file generating application before a file transfer has even been initiated by the source file generating application. Illustrative embodiments capture the intent to transfer the file to a specific target cloud service directly from the source file generating application based on an in-application trigger (i.e., application "intent") using a function call hook. An application intent is an application specific objective or task that the application wants to accomplish or perform. A function call hook alters the behavior of the file generating application by intercepting function calls of the source file generating application.

Illustrative embodiments perform a high-speed file upload from a mobile device to a target cloud service using connections to a FASP server of a high-speed transfer service, such as, for example, Aspera®, which is hidden behind the mobile device. Aspera is a registered trademark of International Business Machines Corporation, Armonk, N.Y. In other words, the FASP server is invisible to the mobile device and the mobile device will not know that a fast and secure file transfer is occurring via the FASP server. These connections are available to any target cloud service, such as any type of file storage service, file sharing service, or social media service. As a result, illustrative embodiments are able to provide increased upload speeds and time savings to users who are using a mobile device that utilizes the FASP-based high-speed file transfer of illustrative embodiments to upload files from their mobile devices to target cloud services.

A user first installs a FASP file transfer application on the user's mobile device. In addition, the user connects the FASP file transfer application to a set of external cloud services (e.g., file storage cloud services, file sharing cloud services, social media services, and the like) in order for the FASP file transfer application to upload files quickly via the FASP server to destinations where the user wants to store and/or share the user's files generated by a set of file generating applications on the mobile device. Thus, illustrative embodiments increase the speed with which a mobile device connects with a target cloud service using FASP, making data file transfer faster from any type of mobile device via any type of network.

As an illustrative example scenario, assume a user of a mobile device captures an image (e.g., a photograph file) of an object (e.g., a pet) using an image generating application corresponding to an imaging device (e.g., a camera) of the mobile device. Now, the user intends to store the image file on at least one of a cloud file storage service, a cloud file sharing service, or a social media service. The FASP file transfer application is running on the mobile device and the mobile device is connected to, for example, a public network, such as the Internet, via Wi-Fi, cellular network, or the like.

The FASP file transfer application running on the mobile device can utilize one of four possible approaches to perform the file transfer intercept or takeover by the FASP file transfer application from the file generating application (e.g., image or sound file generating application) of the mobile device. The four approaches include a direct file transfer approach, an intent intercept approach, a virtual storage approach, and an active network tunneling approach. The FASP file transfer application enables usage of these four approaches even when the source file generating application do not support FASP-based high-speed file transfers. In other words, the FASP file transfer application of illustrative embodiments enables usage of a high-speed file transfer approach without requiring changes to, or cooperation of, the source file generating application.

Using the direct file transfer approach, the FASP file transfer application running on the mobile device acts as a "share with" or "open with" target of the source file generating application for a file, such as a photograph, video, audio recording, or the like. This kind of handoff is supported by most mobile operating systems natively. As a result, the FASP file transfer application automatically performs a high-speed FASP-based transfer of the file from the mobile device to a set of user-specified target cloud services via a FASP server instead of the source file generating application initiating and perform the file transfer.

Using the intent intercept approach, the FASP file transfer application running on the mobile device attaches to the mobile operating system's intents (i.e., announcements of intended actions from source file generating applications to the mobile operating system), which are basically in-application triggers that allow the FASP file transfer application, itself, to intercept intended actions of the source file generating applications (i.e., transfer of files to target cloud services). Using this intent intercept approach, the FASP file transfer application actively overrides the intent handler of the source file generating application for uploading, sharing, or transferring a file to a target cloud service. Then, the FASP file transfer application either handles the FASP-based high-speed transfer of the file on behalf of the source file generating application via the FASP server or hands the file transfer back to the source intent handler when, for example, the mobile device user declines the takeover by the FASP file transfer application or the FASP operation fails.

Using the virtual storage approach, the FASP file transfer application, itself, emulates a local storage on the mobile device, which can be either in-memory or mapped into regular storage of the mobile device. The user utilizes the virtual storage of the FASP file transfer application as a target for any generated file (e.g., photograph, video, audio recording, or the like) by the source file generating application, which is an option offered by most file generating applications. As a result, the FASP file transfer application automatically performs the FASP-based high-speed transfer of any generated data file placed on the virtual storage to a target cloud service via the FASP server or can prompt the user to select a set of target cloud services for the file transfer. This is analogous to using a "share with" menu option.

Using the active network tunneling approach, the FASP file transfer application running on the mobile device acts as a local proxy server configuring the network settings to tunnel all network connections locally. A tunnel is a mechanism used to transfer data across a network using a protocol that is not supported by that network. Tunneling works by encapsulating packets (i.e., wrapping packets inside of other packets). This approach requires either the user to grant administrator or elevated (i.e., non-root) privileges or install a particular mobile operating system profile. If the FASP file transfer application detects an intent of a given file generating application to transfer a file to a target cloud service (e.g., cloud file storage service, cloud file sharing service, or social media service), then the local proxy server (i.e., FASP file transfer application) determines whether the source file generating application supports self-signed certificates with a locally-trusted Certificate Authority for transferring the file to the target cloud service or whether the source file generating application uses certificate pinning for transferring the file to the target cloud service.

If the source file generating application supports self-signed certificates to transfer the file to the target cloud service, then the FASP file transfer application acting as a local proxy server accepts the incoming payload and answers requests on behalf of the target cloud service. If the source file generating application uses certificate pinning to transfer the file to the target cloud service, then the FASP file transfer application acting as the local proxy server switches into network tunneling mode and funnels the file between the mobile device, the FASP server, and the target cloud service using FASP.

If self-signed certificates or certificate pinning is unavailable or unworkable, then the FASP file transfer application running on the mobile device establishes a virtual private network (VPN) service endpoint that captures certain target cloud services (e.g., social media services, cloud file storage services, cloud file sharing services, and the like), but instead of using a regular VPN protocol, the FASP file transfer application acting as the local proxy server utilizes a FASP tunnel to secure and accelerate the file transfer. The FASP file transfer application acting as the local proxy server can keep the connection open for transferring the entire file all at one time or can separate the file into a plurality of chunks for transfer. This can depend on the size of the file to be transferred, the connection speed, and connection quality and whether the FASP file transfer application acting as the local proxy server is actively managing the file transfer using self-signed certificates or is working in tunneling mode using certificate pinning.

If the FASP file transfer application running on the mobile device is not only performing active network tunneling, but is also intercepting the file transfer request on the user's behalf, then the FASP server of the high-speed transfer service needs to deliver the file to the intended target cloud service on the user's behalf In order for the FASP server to transfer the file to the intended target cloud service on the user's behalf, the FASP file transfer application running on the mobile device sends a notification the user to authorize access to the target cloud services, using a secure access protocol, such as, for example, OAuth, Security Assertion Markup Language, or the like, which provide the FASP file transfer application with authorization credentials, such as, for example, a login token, security assertion, or the like, that the FASP file transfer application can use to transfer the file to the intended target cloud service via the FASP server independent of the user.

The FASP file transfer application, once the file transfer has been completed to the FASP server, instructs the FASP server to broadcast the file to the intended set of target cloud services. After the transfer is reported as successful to either all of the target cloud services or a minimum required number of the target cloud services, the FASP file transfer application then automatically deletes or removes the file from the mobile device, if the user selected such an option, freeing up storage space on the mobile device. As a result, the user enjoys automatic high-speed transfers of files to cloud services and increased available storage space on the mobile device. Thus, illustrative embodiments can bring high-speed file transfer to any mobile device user utilizing FASP.

Thus, illustrative embodiments provide one or more technical solutions that overcome a technical problem with enabling high-speed file transfers from a mobile device to a target cloud service even if the mobile device or target cloud service does not support high-speed file transfers. As a result, these one or more technical solutions provide a technical effect and practical application in the field of network file transfers.

Figure 5:
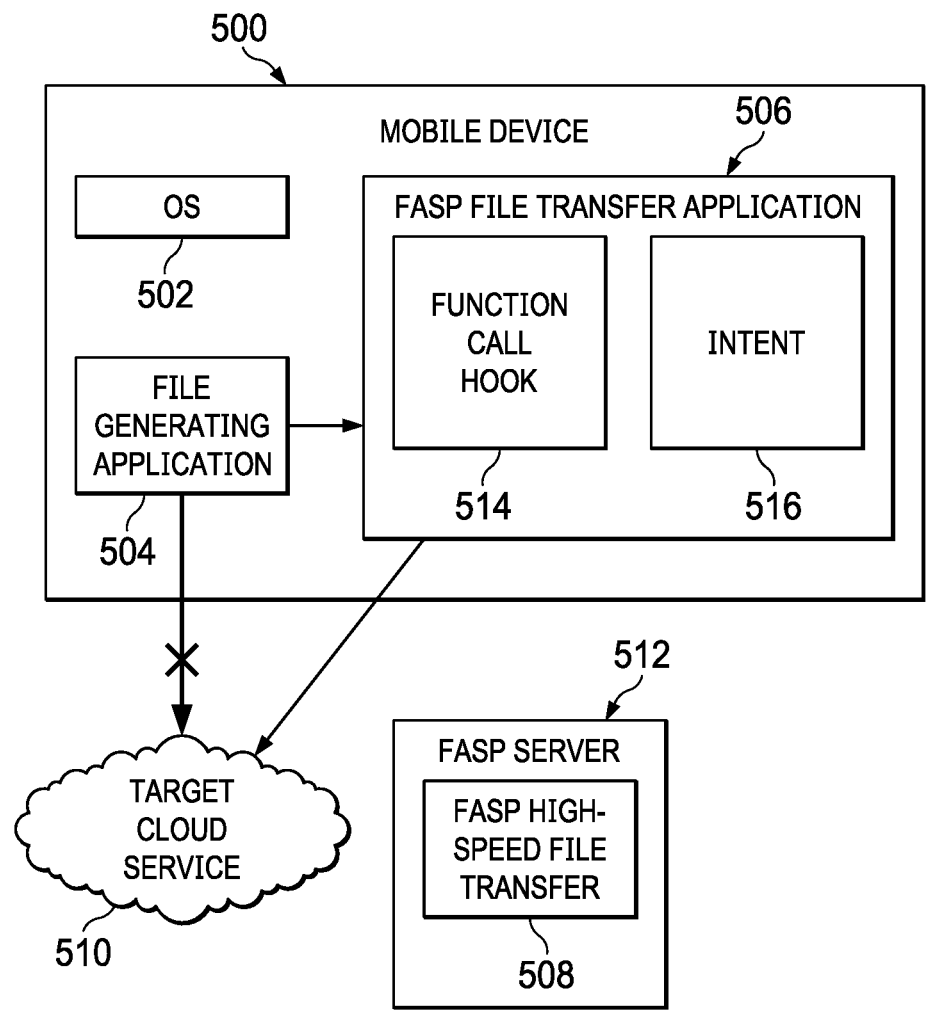
FIG. 5 is a diagram illustrating an example of a mobile device in accordance with an illustrative embodiment.

With reference now to FIG. 5, a diagram illustrating an example of a mobile device is depicted in accordance with an illustrative embodiment. Mobile device 500 may be, for example, client 110 in FIG. 1, data processing system 200 in FIG. 2, or local computing device 320A in FIG. 3.

In this example, mobile device 500 includes operating system 502, file generating application 504, and FASP file transfer application 506. Operating system 502 may represent any type of mobile operating system. File generating application 504 may be, for example, a photograph file generating application, a video file generating application, an audio file generating application, a multimedia file generating application, or the like. Also, file generating application 504 may represent a plurality of different file generating applications loaded on mobile device 500. Further, it should be noted that file generating application 504 corresponds to at least one physical component, such as, for example, a camera, microphone, or the like, of mobile device 500.

FASP file transfer application 506 may be, for example, FASP file transfer manager 218 in FIG. 2. FASP file transfer application 506 automatically performs FASP high-speed file transfer 508 of a file, such as a photograph file, video file, sound recording file, multimedia file, or the like, from mobile device 500 to target cloud service 510 via FASP server 512 using function call hook 514 to intercept intent 516 of file generating application 504 even when file generating application 504 that generated the file or target cloud service 510 does not support FASP high-speed file transfer 508. FASP server 512 may be, for example, server 106 in FIG. 1 or a cloud computing node of cloud computing nodes 310 in FIG. 3. Target cloud service 510 is hosted by a server, such as server 104 in FIG. 1, and may be, for example, a data and file storage service, a photograph and video sharing service, a social media service, or the like.

Intent 516 is the objective of file generating application 504 to initiate and perform the transfer of the generated file to target cloud service 510. However, FASP file transfer application 506 intercepts intent 516 using function call hook 514 prior to file generating application 504 initiating the file transfer, thus preventing file generating application 504 from performing the transfer of the file to target cloud service 510 as illustrated in the example of FIG. 5.

Figure 6:
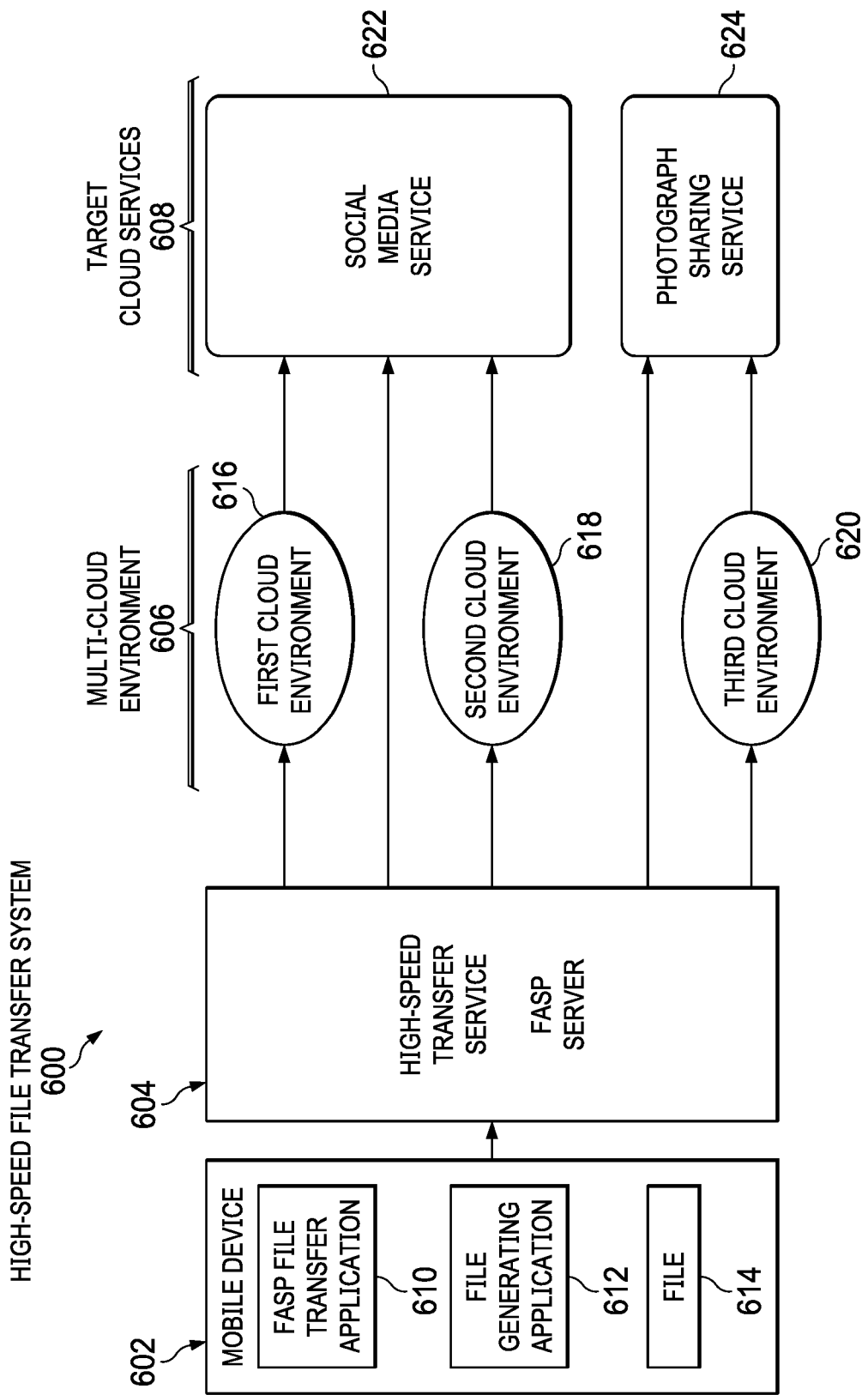
FIG. 6 is a diagram illustrating an example of a high-speed file transfer system in accordance with an illustrative embodiment.

With reference now to FIG. 6, a diagram illustrating an example of a high-speed file transfer system is depicted in accordance with an illustrative embodiment. High-speed file transfer system 600 may be implemented in a network of data processing systems, such as network data processing system 100 in FIG. 1, or a cloud computing environment, such as cloud computing environment 300 in FIG. 3. High-speed file transfer system 600 is a system of hardware and software components for automatically performing high-speed file transfers between source devices and target services.

In this example, high-speed file transfer system 600 includes mobile device 602, high-speed transfer service FASP server 604, multi-cloud environment 606, and target cloud services 608. Mobile device 602 may be, for example, mobile device 500 in FIG. 5 and includes FASP file transfer application 610 and file generating application 612, such as FASP file transfer application 506 and file generating application 504 in FIG. 5.

In response to receiving an input by a user of mobile device 602, file generating application 612 generates file 614, which may be a photograph, video, sound recording, or the like. In response to intercepting the intent, such as intent 516 in FIG. 5, of file generating application 612 to initiate transfer of file 614 to a user-specified set of services of target cloud services 608 using a function call hook, such as function call hook 514 in FIG. 5, FASP file transfer application 610 automatically takes over the process of transferring file 614 to the user-specified set of target cloud services (i.e., social media service 622 and photograph sharing service 624) via high-speed transfer service FASP server 604.

Upon high-speed transfer service FASP server 604 receiving file 614, FASP file transfer application 610 instructs high-speed transfer service FASP server 604 to perform a FASP-based high-speed transfer of file 614 to social media service 622 and photograph sharing service 624. High-speed transfer service FASP server 604 can either transfer file 614 directly to social media service 622 and photograph sharing service 624 or can transfer file 614 to social media service 622 and photograph sharing service 624 via first cloud environment 616, second cloud environment 618, and third cloud environment 620 of multi-cloud environment 606.

Figure 7:
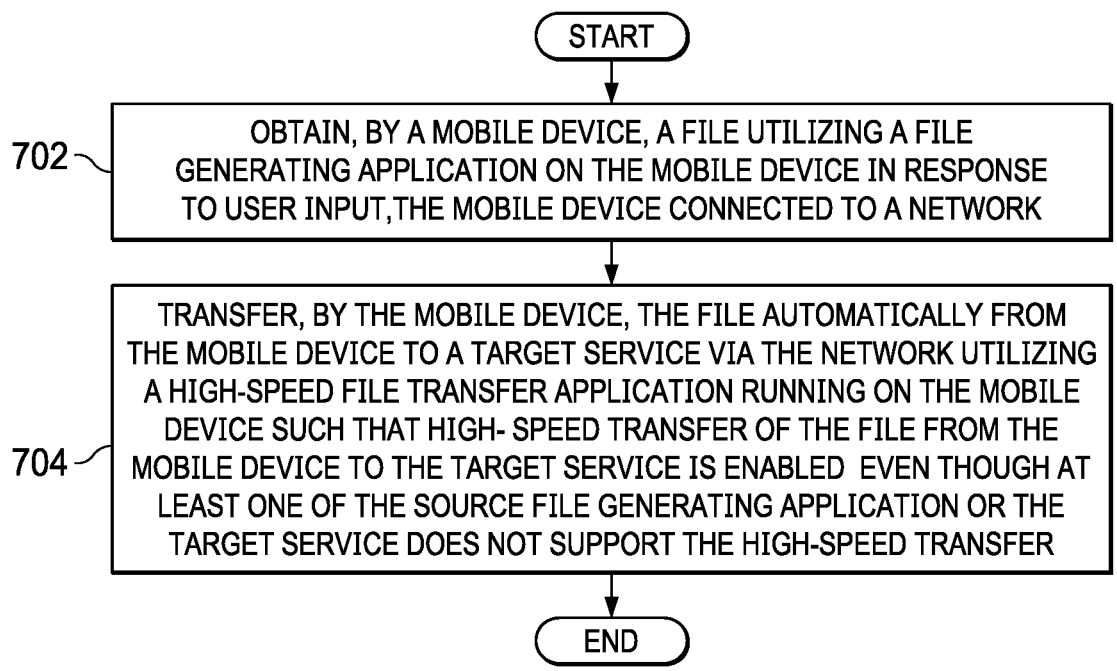
FIG. 7 is a flowchart illustrating a process for automatically transferring a file in accordance with an illustrative embodiment.

With reference now to FIG. 7, a flowchart illustrating a process for automatically transferring a file is shown in accordance with an illustrative embodiment. The process shown in FIG. 7 may be implemented in a mobile device, such as, for example, client 110 in FIG. 1, data processing system 200 in FIG. 2, mobile device 500 in FIG. 5, or mobile device 602 in FIG. 6.

The process begins when the mobile device obtains a file utilizing a file generating application on the mobile device in response to user input (step 702). The file generating application may be, for example, an image capturing application, a sound capturing application, or the like. The user input can be, for example, input to take a picture of an object using a camera of the mobile device, record sounds using a microphone of the mobile device, or the like. The file can be a photograph file, a video file, an audio file, a multimedia file, or the like. In addition, the mobile device is currently or intermittently connected to a network, such as, for example, the Internet, a cellular network, or the like.

The mobile device automatically transfers the file from the mobile device to a target service via the network utilizing a high-speed file transfer application running on the mobile device such that high-speed transfer of the file from the mobile device to the target service is enabled even though at least one of the source file generating application or the target service does not support the high-speed transfer (step 704). The target service is a cloud service, such as, for example, a cloud file storage service, a cloud file sharing service, a social media website, or the like. The high-speed file transfer application is a FASP file transfer application and the high-speed transfer is a FASP-based high-speed transfer. Thereafter, the process terminates.

Figure 8:
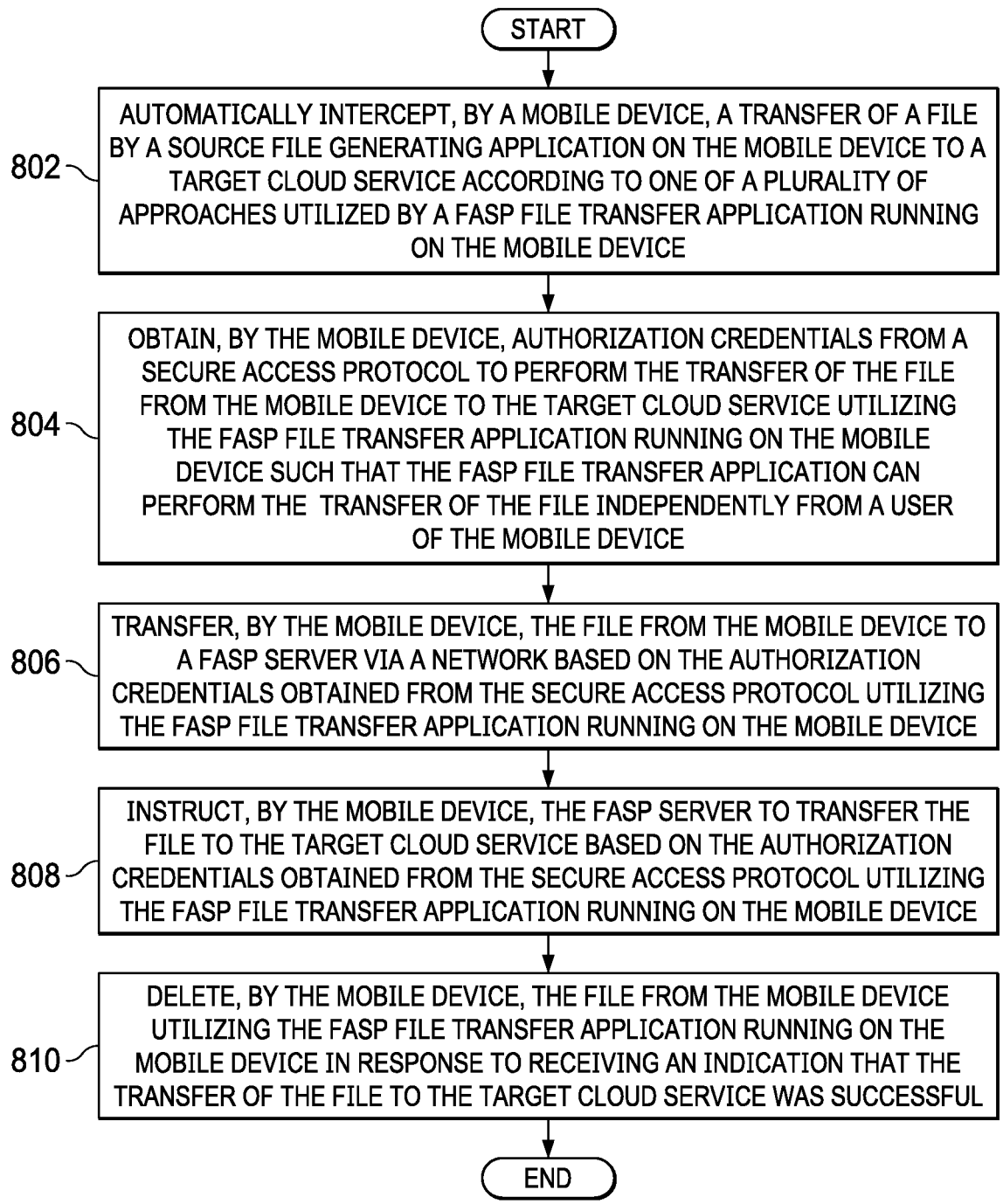
FIG. 8 is a flowchart illustrating a process for automatically intercepting a file transfer in accordance with an illustrative embodiment.

With reference now to FIG. 8, a flowchart illustrating a process for automatically intercepting a file transfer is shown in accordance with an illustrative embodiment. The process shown in FIG. 8 may be implemented in a mobile device, such as, for example, client 110 in FIG. 1, data processing system 200 in FIG. 2, mobile device 500 in FIG. 5, or mobile device 602 in FIG. 6.

The process begins when the mobile device automatically intercepts a transfer of a file by a source file generating application on the mobile device to a target cloud service according to one of a plurality of approaches utilized by a FASP file transfer application running on the mobile device (step 802). The plurality of approaches to automatically intercept the transfer of the file from the mobile device to the target cloud service include a direct file transfer approach, an intent intercept approach, a virtual storage approach, and an active network tunneling approach.

The mobile device obtains authorization credentials from a secure access protocol to perform the transfer of the file from the mobile device to the target cloud service utilizing the FASP file transfer application running on the mobile device such that the FASP file transfer application can perform the transfer of the file independently from a user of the mobile device (step 804). The authorization credentials may be, for example, a login token, an access token, a security assertion, or the like. The mobile device transfers the file from the mobile device to a FASP server via a network based on the authorization credentials obtained from the secure access protocol utilizing the FASP file transfer application running on the mobile device (step 806).

Further, the mobile device instructs the FASP server to transfer the file to the target cloud service based on the authorization credentials obtained from the secure access protocol utilizing the FASP file transfer application running on the mobile device (step 808). Furthermore, the mobile device deletes the file from the mobile device utilizing the FASP file transfer application running on the mobile device in response to receiving an indication that the transfer of the file to the target cloud service was successful (step 810). Thereafter, the process terminates.

Figure 9:
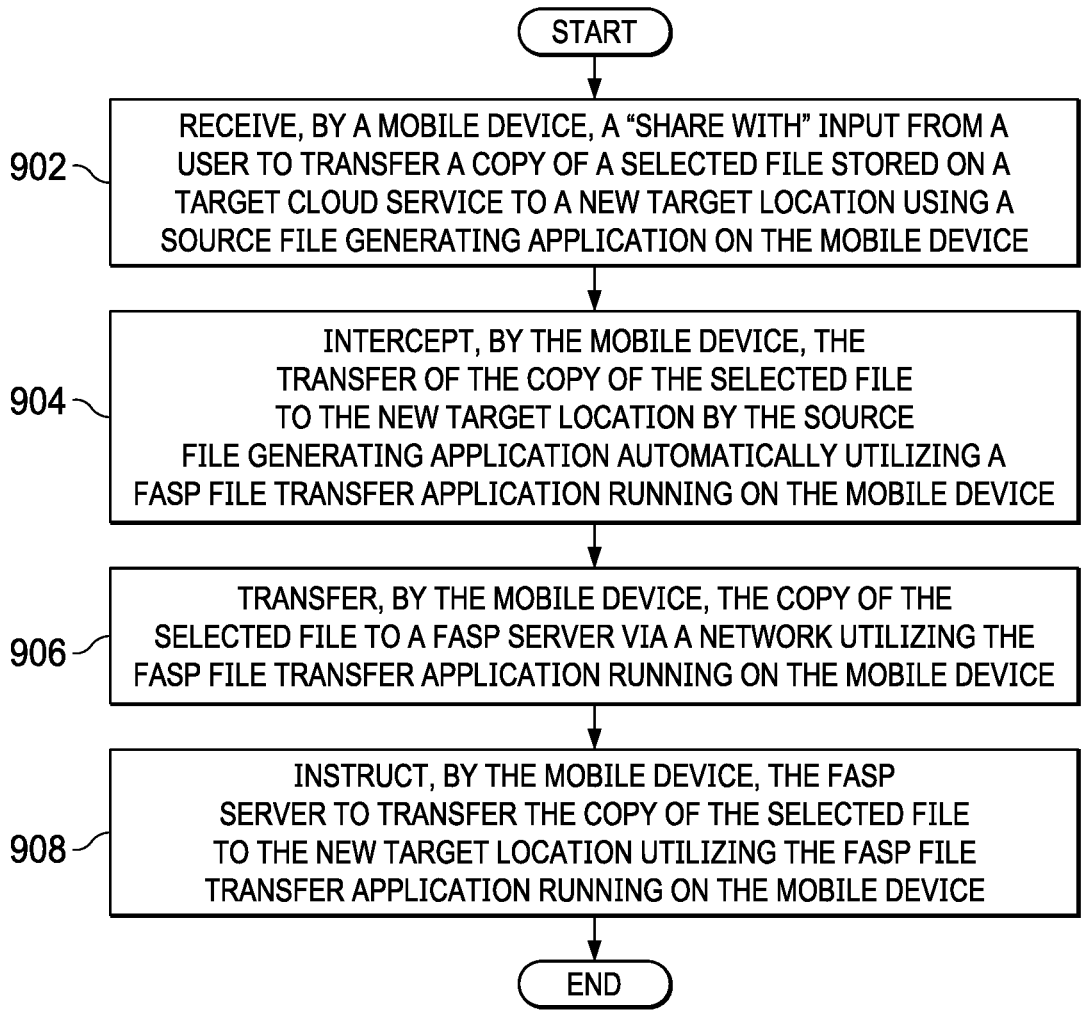
FIG. 9 is a flowchart illustrating a process for file sharing in accordance with an illustrative embodiment.

With reference now to FIG. 9, a flowchart illustrating a process for file sharing is shown in accordance with an illustrative embodiment. The process shown in FIG. 9 may be implemented in a mobile device, such as, for example, client 110 in FIG. 1, data processing system 200 in FIG. 2, mobile device 500 in FIG. 5, or mobile device 602 in FIG. 6.

The process begins when the mobile device receives a "share with" input from a user to transfer a copy of a selected file stored on an original target cloud service to a new target location using a source file generating application on the mobile device (step 902). The new target location may be, for example, a cloud service that is different from the original target cloud service, another device that is different from the mobile device, or the like. The mobile device automatically intercepts the transfer of the copy of the selected file to the new target location by the source file generating application utilizing a FASP file transfer application running on the mobile device (step 904).

The mobile device transfers the copy of the selected file to a FASP server via a network utilizing the FASP file transfer application running on the mobile device (step 906). The mobile device then instructs the FASP server to transfer the copy of the selected file to the new target location utilizing the FASP file transfer application running on the mobile device (step 908). Thereafter, the process terminates.

Thus, illustrative embodiments of the present invention provide a computer-implemented method, computer system, and computer program product for automatically performing high-speed transfers of files via a FASP server using a FASP file transfer application running on a mobile device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic file transfer, the method comprising:
    obtaining, by a mobile device, a file utilizing a file generating application on the mobile device in response to an input from a user, the mobile device connected to a network, wherein the file generating application supports transfer of the file to a target service via the network but does not support high-speed transfer of the file;
    intercepting, by a high-speed file transfer application running on the mobile device, a transfer of the file to the target service by the file generating application, and
    transferring, by the mobile device, the file automatically from the mobile device to the target service via the network utilizing the high-speed file transfer application running on the mobile device such that high-speed transfer of the file from the mobile device to the target service is enabled.

2. The method of claim 1 further comprising:
    obtaining, by the mobile device, authorization credentials from a secure access protocol to perform the transfer of the file from the mobile device to the target service utilizing the high-speed file transfer application running on the mobile device such that the high-speed file transfer application can perform the transfer of the file independent of the user of the mobile device.

3. The method of claim 1 further comprising:
    transferring, by the mobile device, the file from the mobile device to a high-speed transfer service server via the network based on authorization credentials obtained from a secure access protocol utilizing the high-speed file transfer application running on the mobile device; and
    instructing, by the mobile device, the high-speed transfer service server to transfer the file to the target service based on the authorization credentials obtained from the secure access protocol utilizing the high-speed file transfer application running on the mobile device.

4. The method of claim 1 further comprising:
    deleting, by the mobile device, the file from the mobile device utilizing the high-speed file transfer application running on the mobile device in response to receiving an indication that transfer of the file to the target service was successful.

5. The method of claim 1, wherein the high-speed file transfer application utilizes one of a plurality of approaches to automatically intercept transfer of the file from the mobile device to the target service by the file generating application.

6. The method of claim 5, wherein the plurality of approaches to automatically intercept the transfer of the file from the mobile device to the target service by the file generating application includes a direct file transfer approach, an intent intercept approach, a virtual storage approach, and an active network tunneling approach.

7. The method of claim 6, wherein using the direct file transfer approach, the high-speed file transfer application running on the mobile device acts as a target of the file generating application for the file and performs high-speed transfer of the file to the target service on behalf of the file generating application.

8. The method of claim 6, wherein using the intent intercept approach, the high-speed file transfer application running on the mobile device actively overrides an intent handler of the file generating application for transferring the file to the target service and performs high-speed transfer of the file to the target service on behalf of the file generating application.

9. The method of claim 6, wherein using the virtual storage approach, the high-speed file transfer application emulates local storage on the mobile device acting as a target of the file generating application for the file and performs high-speed transfer of the file to the target service on behalf of the file generating application.

10. The method of claim 6, wherein using the active network tunneling approach, the high-speed file transfer application running on the mobile device acts as a local proxy server configuring network settings to tunnel network connections locally and performs high-speed transfer of the file to the target service on behalf of the file generating application.

11. The method of claim 1, wherein the target service is one of a cloud file storage service, a cloud file sharing service, or a social media service.

12. The method of claim 1, wherein the high-speed file transfer application is a fast adaptive and secure protocol (FASP) file transfer application, and wherein high-speed transfer is a FASP-based high-speed file transfer.

13. The method of claim 1, wherein the file is one of a photograph file, a video file, an audio file, or a multimedia file.

14. A mobile device for automatic file transfer, the mobile device comprising:
a bus system;
a storage device connected to the bus system, wherein the storage device stores program instructions; and
a processor connected to the bus system, wherein the processor executes the program instructions to:
obtain a file utilizing a file generating application on the mobile device in response to an input from a user, the mobile device connected to a network, wherein the file generating application supports transfer of the file to a target service via the network but does not support high-speed transfer of the file;
intercepting, by a high-speed file transfer application on the mobile device, a transfer of the file to the target service by the file generating application, and
transfer the file automatically from the mobile device to the target service via the network utilizing the high-speed file transfer application running on the mobile device such that high-speed transfer of the file from the mobile device to the target service is enabled.

15. The mobile device of claim 14, wherein the high-speed file transfer application utilizes one of a plurality of approaches to automatically intercept transfer of the file from the mobile device to the target service by the file generating application, the plurality of approaches to automatically intercept the transfer of the file from the mobile device to the target service by the file generating application includes a direct file transfer approach, an intent intercept approach, a virtual storage approach, and an active network tunneling approach.

16. A computer program product for automatic file transfer, the computer program product comprising a computer-readable storage medium having program instructions embodied therewith, the program instructions executable by a mobile device to cause the mobile device to perform a method of:
obtaining, by the mobile device, a file utilizing a file generating application on the mobile device in response to an input from a user, the mobile device connected to a network, wherein the file generating application supports transfer of the file to a target service via the network but does not support high-speed transfer of the file;
intercepting, by a high-speed file transfer application on the mobile device, a transfer of the file to the target service by the file generating application, and
transferring, by the mobile device, the file automatically from the mobile device to the target service via the network utilizing the high-speed file transfer application running on the mobile device such that high-speed transfer of the file from the mobile device to the target service is enabled.

17. The computer program product of claim 16 further comprising:
obtaining, by the mobile device, authorization credentials from a secure access protocol to perform the transfer of the file from the mobile device to the target service utilizing the high-speed file transfer application running on the mobile device such that the high-speed file transfer application can perform the transfer of the file independent of the user of the mobile device.

18. The computer program product of claim 16 further comprising:
transferring, by the mobile device, the file from the mobile device to a high-speed transfer service server via the network based on authorization credentials obtained from a secure access protocol utilizing the high-speed file transfer application running on the mobile device; and
instructing, by the mobile device, the high-speed transfer service server to transfer the file to the target service based on the authorization credentials obtained from the secure access protocol utilizing the high-speed file transfer application running on the mobile device.

19. The computer program product of claim 16, wherein the high-speed file transfer application utilizes one of a plurality of approaches to automatically intercept transfer of the file from the mobile device to the target service by the file generating application.

20. The computer program product of claim 19, wherein the plurality of approaches to automatically intercept the transfer of the file from the mobile device to the target service by the file generating application includes a direct file transfer approach, an intent intercept approach, a virtual storage approach, and an active network tunneling approach.

* * * * *